United States Patent [19]
Bray

[11] 3,746,640
[45] July 17, 1973

[54] WATER PURIFICATION SYSTEM FOR SMALL REVERSE OSMOSIS UNIT WITH INTEGRAL BLOWDOWN WATER DISPOSAL

[75] Inventor: Donald T. Bray, Escondido, Calif.
[73] Assignee: Desalination Systems, Inc., Escondido, Calif.
[22] Filed: Feb. 17, 1971
[21] Appl. No.: 116,109

[52] U.S. Cl. .................... 210/23, 210/321, 210/433
[51] Int. Cl. ........................ B01d 31/00, B01d 13/00
[58] Field of Search .................... 210/349, 409, 410, 210/321, 433, 23, 257, 258

[56] References Cited
UNITED STATES PATENTS

| | | | |
|---|---|---|---|
| 1,825,631 | 9/1931 | Horvath | 210/23 |
| 1,246,850 | 11/1917 | Best | 210/410 X |
| 3,568,843 | 3/1971 | Brown | 210/321 |
| 3,493,495 | 2/1970 | Mendelson | 210/321 X |
| 3,630,378 | 12/1971 | Bauman | 210/257 |

Primary Examiner—Frank A. Spear, Jr.
Attorney—Clement H. Allen

[57] ABSTRACT

The supply water inlet connection of a conventional reverse osmosis water purifying unit is connected to a pressurized water supply pipe, and the blowdown water connection of the unit is connected to a pressurized enclosure having, when stabilized, a pressure equal to that of the water supply pipe, such as another water supply pipe or a pressurized vessel. The unit is free from flow restriction between its inlet water and blowdown connections, and when pressure is lowered relatively, either in the pressurized supply pipe or the pressurized enclosure, a blowdown surge occurs toward the lowered side and through the unit between the inlet connection and the blowdown connection. Successive surges dispose of sufficient blowdown water, either to the inlet pipe or to the pressurized enclosure to make the system operative without other waste disposal facilities, and without noticeably contaminating the water in the pipe or pipes into which the saline waste water is thus discharged.

9 Claims, 2 Drawing Figures

PATENTED JUL 17 1973 3,746,640

WATER PURIFICATION SYSTEM FOR SMALL REVERSE OSMOSIS UNIT WITH INTEGRAL BLOWDOWN WATER DISPOSAL

BACKGROUND OF THE INVENTION

Purification of brackish water is now practiced widely by the use of small reverse osmosis systems installed adjacent a desired point of use. Such units supply from a few to several gallons of purified water daily for home or office use as drinking and cooking water. Such small systems, referred to in the industry as "home units," usually use a rolled up, bag type osmotic diaphragm with interposed rolled sheet separators which provide flow paths separating adjacent layers of the diaphragm. The rolled diaphragm assembly ordinarily is contained in a cylindrical housing and inlet water, under water main pressure, is supplied to one side of the diaphragm, i.e., either the inside or outside of the bag, while a purified water outlet from the other side of the diaphragm leads to a pressurized storage tank, and also to a dispensing valve or faucet. On the high pressure side of the diaphragm the water tends to become increasingly salty by reason of the collection thereon of the impurities which are prevented by the diaphragm from passing through the diaphragm with the purified water.

Ordinarily such impurities are constantly flushed away by providing a small, controlled trickle flow blowdown outlet at the opposite end of the high pressure side of the diaphragm from the supply water inlet, and connecting such blowdown outlet to a sewer or other waste line. Thus, in addition to the flow of purified water through the diaphragm, there is a constant small volume flow of water along the high pressure side of the diaphragm which carries the blowdown waste water to the sewer or other waste disposal line. At times in the past it has been desired to have one of these units installed at a location in a home, apartment or office building where a sewer or other waste connection is not readily available. However, although it is easy to run a small diameter water supply tube from a water supply line to almost any location in a building, the provision of a sewer connection or other waste line to such remote location is not so easy to provide. For this reason plans for such proposed remote installations have frequently been abandoned as not feasible in view of the expense or difficulty involved in providing a suitable waste disposal line.

SUMMARY OF THE INVENTION

A primary objective of the present invention is to provide a reverse osmosis water purification system employing a home or small daily volume type unit wherein no sewer or similar drain outlet as such is provided, and the blowdown water from the system is disposed of to a selected one or more pressurized water supply pipes by taking advantage of successive pressure surges which normally occur in such pipe or pipes upon the opening of a faucet or other outlet valve from one or another of said pipes.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 1:
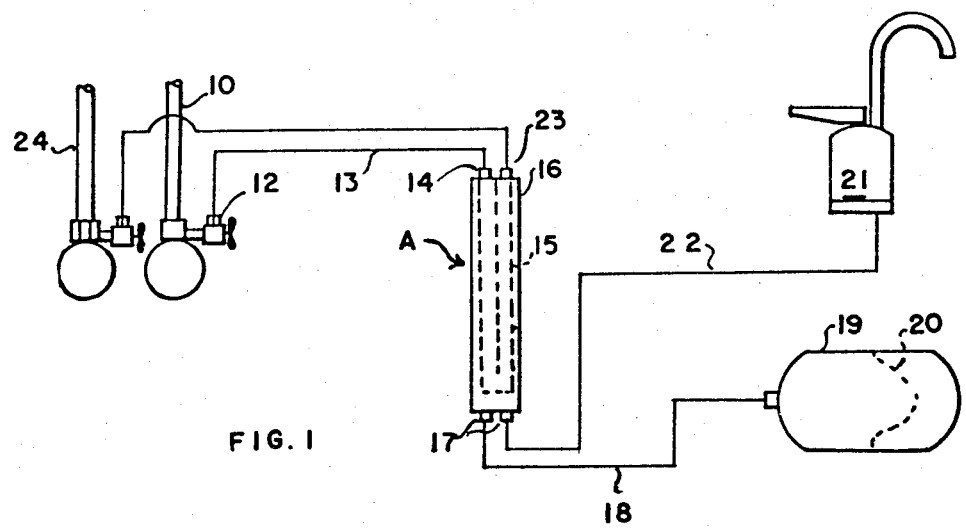
FIG. 1 is a diagrammatic view showing one form of the invention wherein the blowdown connection of the reverse osmosis unit is connected to a pressurized water supply pipe other than that which supplies the feed water to the system.

Referring to the drawings in detail and considering first the system shown in FIG. 1, a pressurized water supply pipe 10 may be, for example, a usual cold water supply pipe from the city or utility water main, not shown, to a house or other building in which a system embodying the invention is installed. From a usual shut-off cock 12 communicating with the cold water supply pipe 10, a small volume tube 13, which may be, for example, quarter inch copper tubing, communicates the cold water supply pipe 10 with the usual feed water inlet connection 14 of the casing 16 of a well known, small capacity, reverse osmosis water purification unit A. This unit may be one of many well known such units, for example, that disclosed in U.S. Pat. No. 3,504,796, which patent is assigned to the same assignee as the present invention.

From the other or low pressure side of the usual micro porous osmotic diaphragm 15 of the unit A, purified product water, having been forced by reverse osmosis through the diaphragm 15, shown diagrammatically in FIG. 1, flows from the pure or product water outlet 17 of the unit A and through a small diameter tube 18 into a product water storage tank 19.

This tank 19 preferably is of a type wherein a flexible impervious diaphragm, indicated diagrammatically by the broken line 20 in FIG. 1, separates the incoming product water from a supply of trapped air on the other side of the diaphragm. Compression of this trapped air by the pressure of the incoming product water, builds up pressure in the tank for discharging the water on demand from a usual dispensing faucet 21 through a small diameter tube 22. A blowdown connection 23 is provided on the casing 16 and communicates with the same or high pressure side of the micro-porous diaphragm 15 of the unit A as the feed water connection 14, but at the opposite end of said diaphragm. Water flowing between the feed water connection 14 and the blowdown connection 23 flows across the high pressure side of the diaphragm 15, flushing it of excessively saline or brackish water resulting from the purifying action of the diaphragm 15 on water forced through the diaphragm.

It is customary in reverse osmosis units such as the unit A to provide some internal restriction between the feed water connection 14 and the blowdown connection 23, since ordinarily the blowdown connection is connected to a sewer or other drain, and without such restriction the water would flow freely through the unit, and, in addition to resulting in a waste of water, it would be difficult if not impossible to maintain operative pressure on the micro-porous diaphragm. Such restrictive means is disclosed, for example, in U.S. Pat. No. 3,504,796, also assigned to the same assignee as the present invention. Such flow restriction is obviously to maintain operative pressure on the high pressure side of the diaphragm for reverse osmosis and to save water. However in the present instance the blowdown connection 23 is connected to a second pressurized water supply line 24 having ordinarily the same pressure as that 10 to which the feed water connection 14 is connected. Therefore, in order to induce a good blowdown flow across the diaphragm 15 during pressure surges across the high pressure side of the diaphragm 15, no restrictions whatever are provided between the feed water connection 14, and the blowdown connection 23.

OPERATION OF FIG. 1

In the system shown in FIG. 1, when hot water is dispensed from the hot water pipe 24, for example, by an occupant of the building in which the system is installed taking a bath, washing dishes etc. pressure drops in the hot water line 24 and a surge occurs from the cold water pipe 10 causing a blowdown flow across the high pressure side of the diaphragm 15, and into the hot water pipe 24. Conversely, when water is drawn from the cold water pipe 10 a similar blowdown surge occurs in the opposite direction and the blowdown water is flushed into the cold water pipe 10.

Obviously, the system will not operate satisfactorily in an installation where there is only an infrequent use of water, as in a single family home with only a few occupants, but in an apartment or office building with several occupants and a frequent use of water, such use causes frequent pressure surges across the high pressure side of the diaphragm to flush it, and a frequent flushing of the blowdown water from the hot and cold water pipes as the water is drawn from them.

Figure 2:
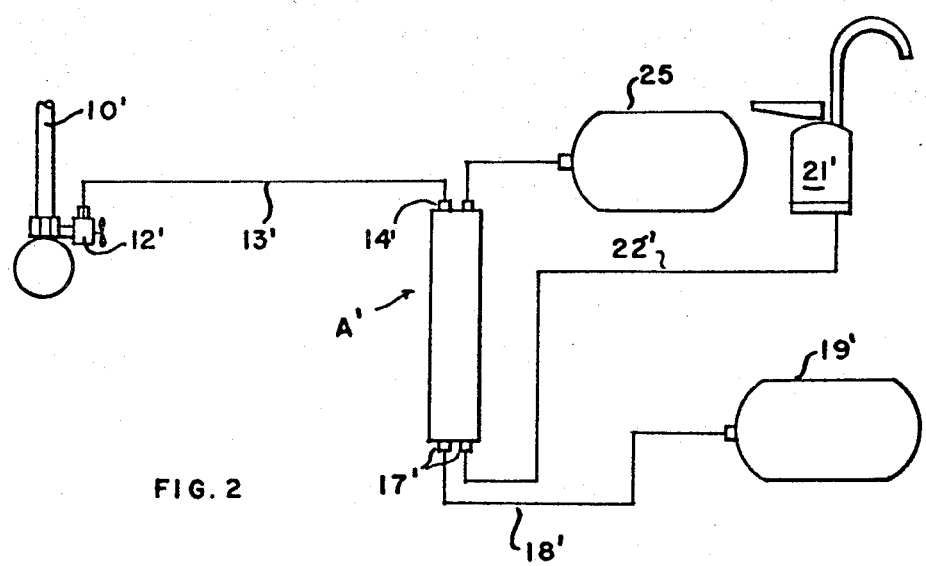
FIG. 2 is a similar diagrammatic view showing a modified form of the invention wherein the blowdown water connection is connected to a pressurized surge tank.

In the modified form of the invention shown in FIG. 2 a similar reverse osmosis unit A' is used, and the installation is in general similar to FIG. 1 with the principal exception that only the single pressurized water supply pipe 10' is used.

Since the parts in FIG. 2 are mainly similar to those shown in FIG. 1, the same reference numerals used in FIG. 1 are used to designate corresponding parts in FIG. 2, with the prime (') added to those in FIG. 2.

The single pressurized water supply pipe 10' communicates through a control cock 12' and tube 13' with the feed water connection 14' of the unit A', and the blowdown connection 23' of the unit A' is connected to an otherwise sealed surge pressure tank 25, Which may be similar to the product water tank 19 of FIG. 1. A product water dispensing faucet 21' and product water tank 19' are connected to product water outlet 17' of the unit A' as explained previously herein with reference to FIG. 1.

As in the unit A of FIG. 1, no restrictions are provided between the water supply pipe 10' and the surge pressure tank 25 of FIG. 2.

OPERATION OF FIG. 2

When the form shown in FIG. 2 is placed in operation, water flows initially from the supply pipe 10' into the surge tank 25 until the air trapped in the latter is at a pressure to balance that in the supply pipe 10'. Thereafter the water pressure from the supply pipe 10' forces purified water by reverse osmosis through the microporous diaphragm 15' of the unit A' into the product water tank 19' until the compression of the air trapped in the latter balances that in the supply pipe 10'. When a faucet or other outlet communicating with the supply pipe 10' is opened, and thereby lowers the pressure in said pipe, the then higher pressure within the surge tank 25 forces water therefrom through the blowdown connection 23' across the high pressure side of the diaphragm 15', out the feed water connection 14 and into the cold water pipe 10'. When such outlet is closed, the then higher pressure in the pipe, since the pressure in the tank 25 was lowered by the flow of water therefrom, causes a blowdown flow in the opposite direction.

The present invention provides an extremely simple reverse osmosis water purification system which requires no external waste connection, no filter, no problems with cross-connection plumbing codes, and no danger of plugging of a restriction means since no such restriction means is present. The only requirement for its satisfactory operation is adequate water use in the building in which it is installed.

I claim:

1. A water purification system comprising, in combination with a reverse osmosis water purification unit having a casing, an osmotic diaphragm therein, a feed water connection on the casing communicating with one side of the diaphragm at one end thereof, a blowdown connection on the casing communicating with said one side of the diaphragm and at the other end thereof from the feed water connection, and a product water connection on the casing communicating with the other side of the diaphragm and sealed from the feed water and blowdown connections:

a small volume conduit communicating the feed water connection without restriction with a pressurized water supply pipe in a building in which the system is installed, a pressurized water-containing enclosure having a pressure therein when communicating With the water supply pipe through the unit equal to that of the water supply line when all outlets to the supply pipe and to the pressurized enclosure are closed, and, a conduit communicating the blowdown connection with the pressurized enclosure, whereby, upon a drop in pressure in the feed water supply line caused by the opening of a faucet or valve communicating therewith, a surge of water is caused to flow thereby across the said one side of said diaphragm from said pressurized enclosure to said feed water supply pipe in a direction opposite to the direction of operating flow across said diaphragm from said feed water supply pipe.

2. A water purification system as claimed in claim 1 wherein the pressurized enclosure is a second water supply pipe in the building in which the system is installed.

3. A water purification system as claimed in claim 2 wherein the water supply pipe is a cold water supply pipe and the pressurized enclosure is a hot water supply pipe.

4. A water purification system as claimed in claim 1 wherein the pressurized enclosure is a pressure tank containing water with which the conduit from the blowdown outlet communicates, and a supply of air is trapped in the container, said air being compressed by a flow of water from the supply pipe into the container to create pressure therein equal to that in the supply pipe.

5. A water purification system as claimed in claim 1 wherein the path between the feed water connection and the blowdown connection across said one side of the diaphragm is free of extraneous restriction.

6. The method of operating a reverse osmosis water purification unit of the type comprising a casing with an osmotic diaphragm therein, a feed water inlet on the casing and communicating with one side of the diaphragm at one end thereof, a blowdown connection on the casing communicating with said one side of the diaphragm at the opposite end thereof from the feed water connection, said casing having also a product water connection communicating with the other side of the diaphragm and sealed from said one side of the diaphragm and from the feed water and blowdown connections; said method comprising connecting the feed water connection by means of a low volume conduit without restriction to a pressurized water supply pipe in a building in which the unit is installed, and connecting the blowdown outlet to a pressurized enclosure having water therein, the pressure in the supply pipe balancing the pressure in the pressurized enclosure with all outlets from the supply pipe and the pressurized container closed, and opening a faucet or valve in said pressurized water supply pipe to cause pressure drops therein and successive surges of water to flow across the said one side of said diaphragm from said pressurized enclosure to said feed water supply pipe in a direction opposite to the direction of operating flow across said diaphragm from said feed water supply pipe.

7. The method defined in claim 6 wherein the pressurized enclosure is another water supply pipe in the same building.

8. The method defined in claim 7 wherein one of the pipes is a hot water pipe and the other is a cold water pipe.

9. The method claimed in claim 6 wherein the pressurized enclosure is a pressure tank having means therein for equalizing the pressure of the water therein with that of the water in the supply pipe with all outlets from the supply pipe and the tank closed.

* * * * *